(12) United States Patent
Gregg et al.

(10) Patent No.: US 12,703,045 B2
(45) Date of Patent: Aug. 11, 2026

(54) VARIABLE RING BEAM GENERATOR

(71) Applicant: Lumentum Operations LLC, San Jose, CA (US)

(72) Inventors: Patrick Gregg, Sunnyvale, CA (US); Martin H. Muendel, Oakland, CA (US); Richard D. Faulhaber, San Carlos, CA (US); Alex Hatcher, San Jose, CA (US); John Peck, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 1164 days.

(21) Appl. No.: 17/644,610

(22) Filed: Dec. 16, 2021

(65) Prior Publication Data

US 2023/0094713 A1 Mar. 30, 2023

Related U.S. Application Data

(60) Provisional application No. 63/261,901, filed on Sep. 30, 2021.

(51) Int. Cl.
*B23K 26/06* (2014.01)
*B23K 26/062* (2014.01)
(Continued)

(52) U.S. Cl.
CPC ...... *B23K 26/0648* (2013.01); *B23K 26/0626* (2013.01); *G02B 6/02042* (2013.01); *G02B 6/028* (2013.01); *G02B 6/4206* (2013.01)

(58) Field of Classification Search
CPC ............ B23K 26/0648; B23K 26/0626; G02B 6/02042; G02B 6/028; G02B 6/4206
See application file for complete search history.

(56) References Cited

U.S. PATENT DOCUMENTS 5,708,499 A 1/1998 Baden et al.
7,592,568 B2 9/2009 Varnham et al.
(Continued)

FOREIGN PATENT DOCUMENTS

CN 111323928 A 6/2020
JP S5254450 A 5/1977
(Continued)

OTHER PUBLICATIONS

Su L, Chiang KS, Lu C. Microbend-induced mode coupling in a graded-index multimode fiber. Appl Opt. Dec. 1, 2005;44(34):7394-402. doi: 10.1364/ao.44.007394. PMID: 16353811. (Year: 2005).*
(Continued)

*Primary Examiner* — Peter Radkowski
(74) *Attorney, Agent, or Firm* — Harrity & Harrity, LLP

(57) ABSTRACT

An optical assembly may comprise an input fiber to provide a beam, a process fiber comprising a ring-shaped outer core surrounded by a cladding, and a first beam shifter arranged to receive the beam from the input fiber and to shift the beam spatially to illuminate the ring-shaped outer core of the process fiber. The optical assembly may further comprise a second beam shifter arranged to receive the beam from the first beam shifter and to add skew to the beam that is launched into the ring-shaped outer core of the process fiber.

20 Claims, 9 Drawing Sheets

(51) Int. Cl.

| | |
|---|---|
| ***B23K 26/064*** | (2014.01) |
| ***G02B 6/02*** | (2006.01) |
| ***G02B 6/028*** | (2006.01) |
| ***G02B 6/42*** | (2006.01) |

(56) References Cited

U.S. PATENT DOCUMENTS

| | | | | |
|---|---|---|---|---|
| 9,250,390 | B2 | 2/2016 | Muendel et al. | |
| 10,254,484 | B2 | 4/2019 | Chann et al. | |
| 10,656,330 | B2 * | 5/2020 | Victor | G02B 27/0994 |
| 10,656,440 | B2 * | 5/2020 | Kliner | B23K 26/073 |
| 10,705,291 | B2 * | 7/2020 | Urushibara | G02B 6/14 |
| 11,331,757 | B2 | 5/2022 | Malinowski et al. | |
| 2005/0201674 | A1 | 9/2005 | Ellwood, Jr. | |
| 2006/0135870 | A1 | 6/2006 | Webler | |
| 2018/0180803 | A1 * | 6/2018 | Victor | G02B 6/14 |
| 2018/0217407 | A1 * | 8/2018 | Kliner | B23K 26/064 |
| 2019/0187365 | A1 * | 6/2019 | Urushibara | G02B 6/14 |
| 2019/0262949 | A1 | 8/2019 | Malinowski et al. | |
| 2019/0375050 | A1 | 12/2019 | Yang et al. | |
| 2020/0116926 | A9 * | 4/2020 | Victor | B23K 26/38 |
| 2021/0373261 | A1 | 12/2021 | Muendel et al. | |

FOREIGN PATENT DOCUMENTS

| | | | |
|---|---|---|---|
| JP | 2007518566 | A | 7/2007 |
| JP | 2015500571 | A | 1/2015 |
| JP | 2018072854 | A | 5/2018 |
| JP | 2019531190 | A | 10/2019 |
| JP | 2020088110 | A | 6/2020 |
| JP | 2021511967 | A | 5/2021 |

OTHER PUBLICATIONS

Song Qiu, Yuan Ren, Tong Liu, Zhengliang Liu, Chen Wang, You Ding, Qimeng Sha, and Hao Wu, "Directly observing the skew angle of a Poynting vector in an OAM carrying beam via angular diffraction," Opt. Lett. 46, 3484-3487 (2021) (Year: 2021).*

Shachar Resisi, Yehonatan Viernik, Sebastien M. Popoff, Yaron Bromberg; Wavefront shaping in multimode fibers by transmission matrix engineering. APL Photonics Mar. 1, 2020; 5 (3): 036103. https://doi.org/10.1063/1.5136334 (Year: 2020).*

Wang et al., "Helical-core ytterbium-doped fibre laser," Electronics Letters, vol. 40, No. 21, Oct. 14, 2004 (2 pages).

* cited by examiner

400

410

660

VARIABLE RING BEAM GENERATOR

CROSS-REFERENCE TO RELATED APPLICATION

This Patent Application claims priority to U.S. Provisional Patent Application No. 63/261,901, filed on Sep. 30, 2021, and entitled "VARIABLE RING BEAM GENERATOR." The disclosure of the prior Application is considered part of and incorporated by reference into this Patent Application.

TECHNICAL FIELD

The present disclosure generally relates to steering or otherwise routing an optical beam through a graded index fiber with a set of bends that have a bend period matched to or nearly matched to a pitch of the graded index fiber, and more particularly, to manipulating a light field pattern in a near field of a process fiber or a delivery fiber in order to generate a beam with a ring-shaped intensity pattern and a variable ring thickness.

BACKGROUND

Laser material processing can be used for cutting, drilling, welding, brazing, surface annealing, alloying, hardening, and/or other applications. In particular, laser material processing generally includes using one or more optical fibers to deliver a high-power and/or high-intensity laser beam to a workpiece on which the laser material processing is to be performed. For example, a typical fiber-delivered laser material processing system may include a laser source (e.g., one or more fiber laser modules), an optical coupler unit, a delivery fiber (typically 10-50 meters in length and included in a delivery cable that may be pluggable on one or both ends), and a processing head. The processing head is an optical assembly that includes a receptacle for the delivery fiber, optics for projecting the laser power, and any components needed for laser-based processing. In operation, the laser source transmits a laser light emission into the optical coupler unit (e.g., through free space or through a separate optical fiber), and the optical coupler unit, which may internally transmit the emission through optical fiber or through free space, and which may magnify or de-magnify the emission, couples the laser light emission into the delivery fiber. The delivery fiber then transmits the laser light to the processing head, which projects the laser light onto a workpiece in association with performing the material processing task. Accordingly, advantages of laser material processing may include high productivity, a non-contact nature of processing, improved quality, and/or a high precision and mobility of a delivery point of the laser beam, among other examples.

One challenge that arises in the context of laser material processing relates to fiber beam shaping (e.g., for cutting, welding, and/or other applications), which is an increasingly important aspect of high-power laser material processing. For example, in some cases, the high power and excellent beam quality of fiber lasers may be leveraged to perform "keyhole welding" with high aspect ratio penetration profiles in narrow fusion zones with low distortion and minimal heat-affected zones. In other examples, a larger laser spot size with a lower power density can be used to perform shallower "conduction welding" that may be used for aesthetic welds and/or minimizing a need for post-processing steps. In still other examples, processing different materials, or materials with different thicknesses, may require different properties in an optical beam (e.g., a high-brightness, small spot size may be desired for some materials, while other materials may require a larger, higher-divergence beam). Accordingly, a laser system with beam shaping capabilities and capabilities to cycle or otherwise transition among multiple states in order to control and/or vary the properties of an optical beam may be desirable.

SUMMARY

In some implementations, an optical assembly includes an input fiber to provide a beam; a process fiber comprising a ring-shaped outer core surrounded by a cladding; a first beam shifter arranged to receive the beam from the input fiber and to shift the beam spatially to illuminate the ring-shaped outer core of the process fiber; and a second beam shifter arranged to receive the beam from the first beam shifter and to add skew to the beam that is launched into the ring-shaped outer core of the process fiber.

In some implementations, an optical assembly includes an input fiber to provide a beam; a process fiber comprising a ring-shaped outer core surrounded by a cladding; and a graded index fiber, coupled between the input fiber and the process fiber, arranged to receive the beam from the input fiber and to transmit the beam into the ring-shaped outer core of the process fiber, wherein the graded index fiber includes a beam shifter arranged to add skew to the beam that is transmitted into the ring-shaped outer core of the process fiber.

In some implementations, an optical assembly includes an input fiber to provide a beam; a process fiber comprising a single core surrounded by a cladding; and one or more resonant beam shifters, coupled between the input fiber and the process fiber, to add skew to the beam such that the beam has a ring-shaped intensity distribution at an exit from the single core of the process fiber.

DETAILED DESCRIPTION

Figure 1:
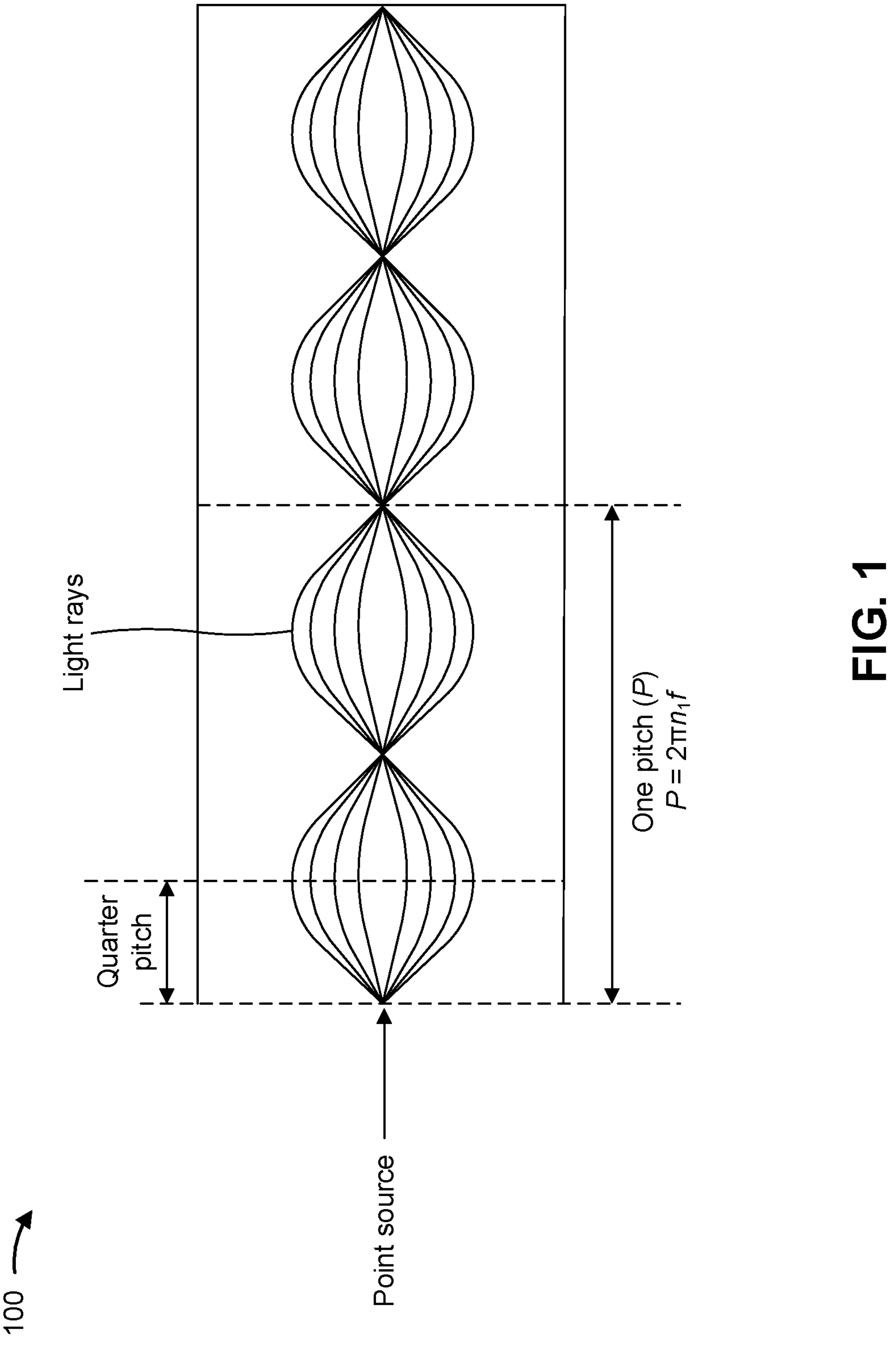
FIG. 1 is a diagram of a graded index fiber.

The following detailed description of example implementations refers to the accompanying drawings. The same reference numbers in different drawings may identify the same or similar elements.

As described above, fiber beam shaping is an increasingly important aspect of high-power (e.g., greater than 100 watts (W)) laser material processing and/or other applications where a rasterable fiber source may be desirable (e.g., light detection and ranging (LIDAR) and/or endoscopic microscopy, among other examples). For example, a laser that can control and vary beam properties is desirable in the context of laser material processing because different materials, materials with different thicknesses, and/or different material processing techniques may require different properties in an optical beam. For example, a high-brightness, small spot is generally desired for thin stainless steel (e.g., stainless steel with a thickness of less than 3 millimeters (mm)), whereas a larger, higher-divergence beam may be desired for thicker mild steel (e.g., steel with a thickness of more than 12 mm). In another example, a ring-shaped intensity distribution may be desirable in many material processing applications (e.g., heat conduction mode welding) because ring-shaped intensity distributions can have a more uniform melt pool (e.g., due to a lack of intensity in a beam center) and/or a significantly higher peak intensity compared to a top-hat beam of the same total power and outer diameter (e.g., due to a lower effective area), while a top-hat beam may be more desirable for other material processing techniques such as transition mode welding.

Accordingly, an important factor in designing a laser system with beam shaping capabilities is to provide the ability to cycle or otherwise transition among multiple states that produce optical beams with different properties. However, an actuation method is needed to toggle among the different states, which presents a challenge for kilowatt (kW) lasers because the actuation method must be essentially lossless. For example, switches used in telecom and/or datacom applications can incur 0.5 decibels (dB) of loss or more, which is unacceptable for such high powers. The need to provide a lossless actuation method to toggle among different states, in addition to the desirability of keeping the entire system in-fiber for improved manufacturability and reduced alignment tolerances, greatly restricts possible actuation options. Although one simple actuation approach may be to have two laser engines that can be independently turned on and off, this actuation approach significantly increases system cost.

Graded index fibers present one possible alternative to having two independently controlled laser engines. In particular, a graded index fiber generally has a refractive index profile, a square of which is parabolic or near-parabolic, as shown in the following expression:

$$n^2 = n_1^2 - \frac{r^2}{f^2};\ r \le r_{clad}$$

where $n_1$ is a peak (or maximum) refractive index, r is a radial coordinate (e.g., a distance from a center of the graded index fiber), and f is a focal length of the graded index fiber, as related to a pitch of the graded index fiber. Accordingly, bending a graded index fiber generally results in a translation of the beam center, proportional to the curvature of the bend (1/the local bend radius ($R_{bend}$)). The displacement ($\Delta x$) is also dependent on properties of the graded index fiber, such as the focal length (f) and the peak/maximum refractive index ($n_1$) of the graded index fiber, as shown in the following expression:

$$\Delta x = \frac{n_1^2 f^2}{R_{bend}}$$

Thus, one potential method to provide an all-in-fiber beam switch is to use a graded index fiber and bend the graded index fiber adiabatically to varying degrees, such that different beam offset positions inside the fiber can be achieved depending on the curvature of the bend. However, for large offsets, adiabatic bending requires long lengths of bent fiber and large overall bend angles, and may cause significant stress on the fiber, which may lead to breakage. Moreover, if such a shift is desired to achieve a variable-offset launch into a second fiber (e.g., a multicore fiber, a multi-rotary fiber, and/or another suitable fiber), the stress occurs exactly at a splice point, which makes splice optimization more difficult, and makes the splice more prone to failure.

Some implementations described herein relate to a device and method that use a periodic reimaging property of a graded index fiber to route an optical beam within an optical fiber or translate an optical beam in space using a well-controlled series of bends. In this way, by using a series of smaller-strength bends rather than a single long adiabatic bend, some implementations described herein may enable a larger range of beam steering (e.g., relative to a single bend), because large bends may be limited by local stress applied to the optical fiber. Additionally, or alternatively, a single short bend at a well-controlled position (rather than a series of bends) may be formed in the graded index fiber, which may reduce stress on the graded index fiber and reduce the need for the bend apparatus to be precisely tailored to the periodicity or pitch of a particular graded index fiber. Furthermore, by routing the optical beam within an optical fiber, some implementations described herein may eliminate or reduce input/output coupling loss into the routing device and improve manufacturability with reduced alignment tolerances. Additionally, some implementations described herein can be used to route beams in both space and angle, enabling controlled two-dimensional beam steering out of an optical fiber. In some implementations, the device and method described herein may be used in kW fiber beam shaping or in other fields such as LIDAR, endoscopic microscopy, and/or any other suitable application in which a rasterable fiber source may be desirable.

For example, as described in further detail herein, some implementations may enable resonant beam control to manipulate a light field pattern in a near field of a process fiber or a delivery fiber to generate a ring intensity pattern with a variable ring thickness from a single fiber. For example, some implementations described herein relate to an optical assembly that includes a first resonant beam shifter that may receive a beam from an input fiber and shift the beam spatially such that the beam illuminates a ring-shaped outer core (rather than a center core) of a process fiber, which creates a ring-shaped beam with a diameter corresponding to an outer cladding diameter and a thickness corresponding to a thickness of the ring-shaped outer core. Furthermore, a second resonant beam shifter may add skew to the light rays launched into the process fiber, which causes more intensity to be pushed toward the outer edges of the ring-shaped outer core, resulting in a thinner ring. In this way, the resonant beam control may be used to generate a ring-shaped beam with a variable ring diameter, ring intensity, ring thickness, and/or other controllable properties.

FIG. 1 illustrates an example 100 of a graded index fiber. More particularly, as described herein, a square of a refractive index profile of a graded index fiber may be parabolic or near-parabolic (e.g., in a core region), where the refractive index varies smoothly in a radial direction from an axis of the graded index fiber to a certain radial position. In other words, the graded index fiber has a refractive index profile that is parabolic or near-parabolic in cross-section, and uniform along a length of the graded index fiber. Accordingly, light rays that propagate through the graded index fiber follow a periodic trajectory through the parabolic or near-parabolic refractive index profile of the graded index fiber. For example, as shown in FIG. 1, one or more light rays that originate from a point source (e.g., a laser source and/or an input fiber coupled to a laser source, among other examples) may propagate through the graded index fiber.

Due to periodic imaging properties of the graded index fiber, the point source is exactly reimaged every pitch (and imaged but inverted every half-pitch). Mathematically, the light rays traveling through a single pitch of the graded index fiber are calculated as four successive Fourier transforms, representing collimation (e.g., in a first quarter-pitch), focusing to an inverted image (e.g., in a second quarter-pitch), collimation (e.g., in a third quarter-pitch), and focusing again (e.g., in a fourth quarter-pitch). In some implementations, the pitch of the graded index fiber is determined by a core diameter and a numerical aperture when the graded index fiber is drawn. In some implementations, as described herein, periodic bending of the graded index fiber, with a bend period matched to or nearly matched to a pitch of the graded index fiber, yields a much stronger and more versatile modification of the beam path, compared with adiabatic bending.

As indicated above, FIG. 1 is provided as an example. Other examples may differ from what is described with regard to FIG. 1.

Figure 2:
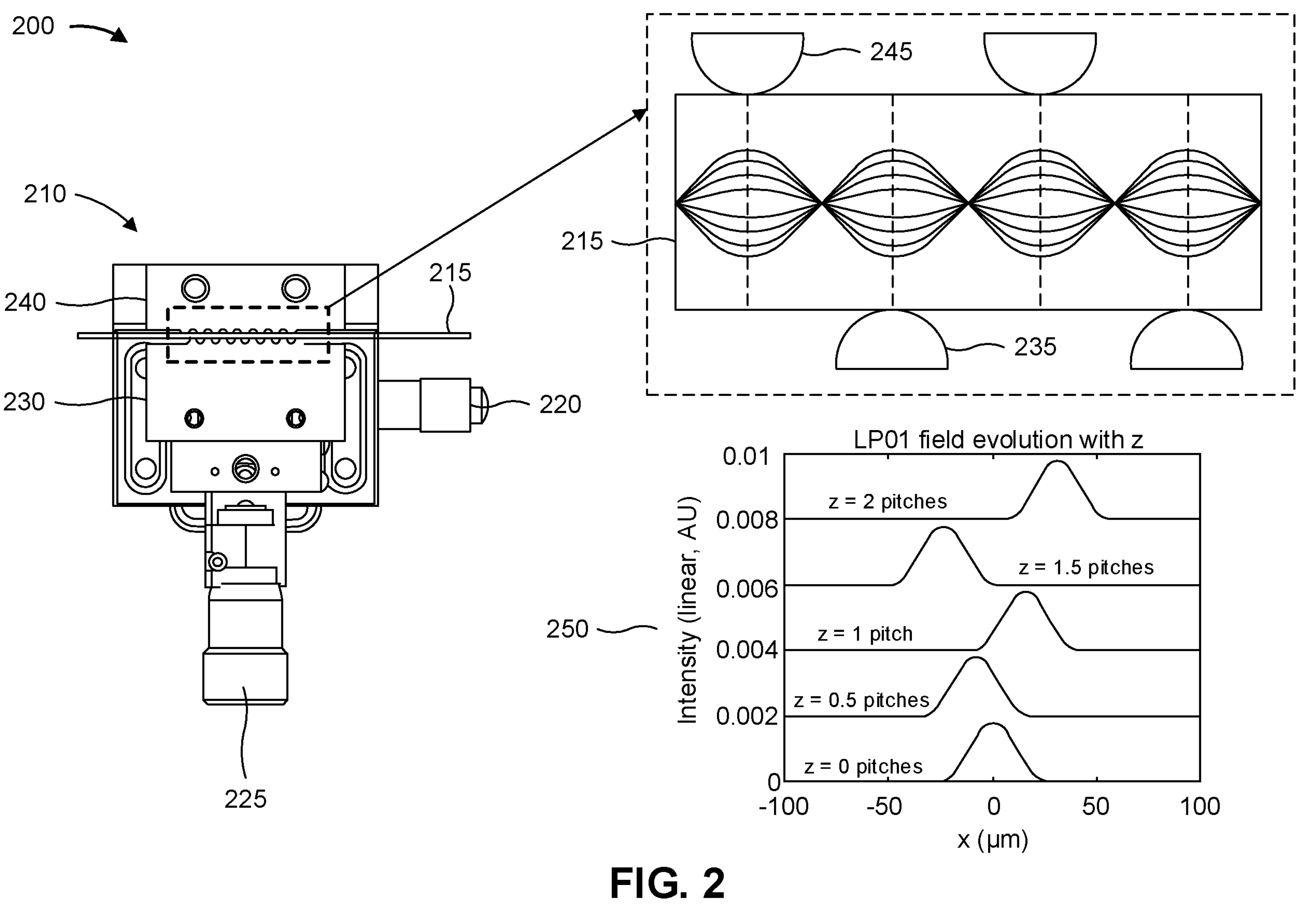
FIG. 2 is a diagram of one or more example implementations of a bending device that can be used to apply one or more bends in a graded index fiber.

FIG. 2 is a diagram of one or more example implementations 200 of a bending device 210 that can be used to apply one or more bends in a graded index fiber 215. In some implementations, as described herein, the bending device 210 may be designed to apply a series of bends to the graded index fiber 215 in alternating directions at every odd quarter-pitch (e.g., every half-pitch, starting from a first quarter-pitch) based on the periodic imaging behavior of the graded index fiber 215. In this way, the series of bends may have a bend period that is matched to, or nearly matched to, a pitch of the graded index fiber 215. For example, for a perfect fiber, the period of the bending device 210 would be equal to the pitch of the graded index fiber 215. However, due to fiber manufacturing tolerances, the fabricated pitch can deviate from the nominal value. To correct for the deviation between the fabricated pitch and the nominal value, the bending device 210 may be fabricated to have a period that is shorter than the pitch of the graded index fiber 215, and the bending device 210 may be placed on a goniometer stage 220 (e.g., a device that measures an angle or permits an object to be rotated to a definite position). In some implementations, the goniometer stage 220 may include a knob or other rotation mechanism to rotate the bending device 210 with respect to the graded index fiber 215 in order to elongate the effective period applied to the graded index fiber 215 and enable in-situ adjustments of the period of the perturbations that cause the bends to be formed in the graded index fiber 215.

As described herein, for a given acceptable level of curvature to be imposed on the graded index fiber 215, the bending device 210 may allow a beam to be displaced approximately 4N times farther than using a single adiabatic bend, where N is a number of pitches in the graded index fiber 215. In other words, for a targeted amount of beam offset, the bending device 210 enables the beam offset to be achieved using approximately ¼N times as much bend curvature on the graded index fiber 215. Accordingly, the bending device 210 utilizes the bending properties of the graded index fiber 215 much more effectively than adiabatic bending. In this way, the bending device 210 imposes much less stress on the graded index fiber 215, provides much greater performance, and significantly simplifies mechanical implementation.

As shown in FIG. 2, the graded index fiber 215, which is nominally N pitches long, is routed through the bending device 210. In some implementations, the bending device 210 has one or more protrusions 235, 245 with a period (Λ) that is matched to or nearly matched to (e.g., a threshold amount shorter than) a pitch of the graded index fiber 215. At a neutral setting, the protrusions 235, 245 of the bending device 210 are not in contact with the graded index fiber 215 or are barely in contact with the graded index fiber 215. Accordingly, in the neutral setting, the protrusions 235, 245 are exerting no force on the graded index fiber 215. In general, as described above, light launched on-axis at an entrance to the graded index fiber 215 leaves on-axis ($\Delta x=0$), and exactly re-imaged. This fiber state is particularly useful to generate a nominally unperturbed, high-beam-quality output state.

In some implementations, the bending device 210 includes an actuation mechanism 225, such as a micrometer knob and/or another suitable actuator, that may be adjusted to cause a first section 230 of the bending device 210 to move toward a second section 240 of the bending device 210. In some implementations, when the actuation mechanism 225 is adjusted to move the first section 230 toward the second section 240, the protrusions 235, 245 cause the graded index fiber 215 to bend in a wavelike pattern. In some implementations, the bending device 210 may be aligned such that one or more protrusions 235 of the first section 230 and one or more protrusions 245 of the second section 240 align with odd quarter-pitch lengths of the graded index fiber 215. In this way, when the protrusions 235, 245 cause the graded index fiber 215 to bend in the wavelike pattern, a series of bends may be formed in the graded index fiber 215, with a first bend in the series of bends aligned with a first quarter-pitch length of the graded index fiber 215 and each bend in the series of bends spaced a half-pitch length from an adjacent bend. Accordingly, the series of bends that are formed in the graded index fiber 215 are resonant with the intrinsic periodicity of the graded index fiber 215. A small local bend is equivalent to introducing a tilt in the graded index fiber 215, and because the Fourier transform of a tilt is an offset, the resulting effect is that a beam propagating through the graded index fiber 215 is gradually offset from the center of the graded index fiber 215 every half-pitch, as shown by plot 250. The bends (or tilts) that occur every half-pitch are opposite in sign with respect to an axis of the graded index fiber 215, which complements the image-flipping behavior of the graded index fiber 215 every half-pitch and allows the offsets to add constructively. Accordingly, the total offset is controllable by the number of periods of the bending device 210, and how much the two sections 230, 240 of the bending device 210 move toward each other.

In some implementations, configuring the bending device 210 as shown in FIG. 2 may provide a bend with a strength that is independent of the focal length of the graded index fiber 215 to first order. In this way, the graded index fiber 215 can be freely chosen according to other system constraints, such as better mode-matching to an input fiber that is coupled to the graded index fiber 215 to provide a beam to the graded index fiber 215 and/or an output fiber that is coupled to the graded index fiber 215 to receive a beam after traveling through the graded index fiber 215, among other examples. In such cases, the period of the bend apparatus 210 (e.g., a periodicity of the protrusions 235, 245 that cause the bends to be formed in the graded index fiber 215) may be adjusted to correspond to the pitch of the graded index fiber 215. In general, beam-shifting behavior of the bending device 210 is not strongly dependent on the precise shape of the periodic curve induced in the graded index fiber 215. For example, the graded index fiber 215 may be bent in a sinusoidal pattern or another smoothly-varying oscillating curve, an alternating sequence of circular arcs, and/or a sequence of straight or near-straight segments connected by sharp bends near the odd quarter-pitch positions, among other examples. For example, the graded index fiber 215 may have a natural elastic bending shape when bent by near-point-contact actuators as shown in FIG. 2, which creates a smoothly-varying curve that is close to sinusoidal.

In one numerical example of the bending device 210, an input beam provided by an input fiber may have a spot diameter of 50 microns and a divergence of 0.1 radians. Using a fused-silica graded index fiber 215 with a focal length of 750 microns and a numerical aperture (NA) of 0.21, and accounting for the stress-optic effect induced by the bends in the graded index fiber 215, using four alternating bends (e.g., corresponding to two pitches of the graded index fiber 215, as shown in FIG. 2) of 2.4 degrees apiece, spaced by a half-pitch length of 3.5 mm, may generate 100 microns of beam position offset, which is a practical and useful amount in comparison with the actual beam size of 50 microns. The actual bend angle of 2.4 degrees is relatively small and straightforward to actuate upon the graded index fiber 215 without causing damage to the graded index fiber 215 or requiring complicated fiber handling or geometry.

Figure 3:
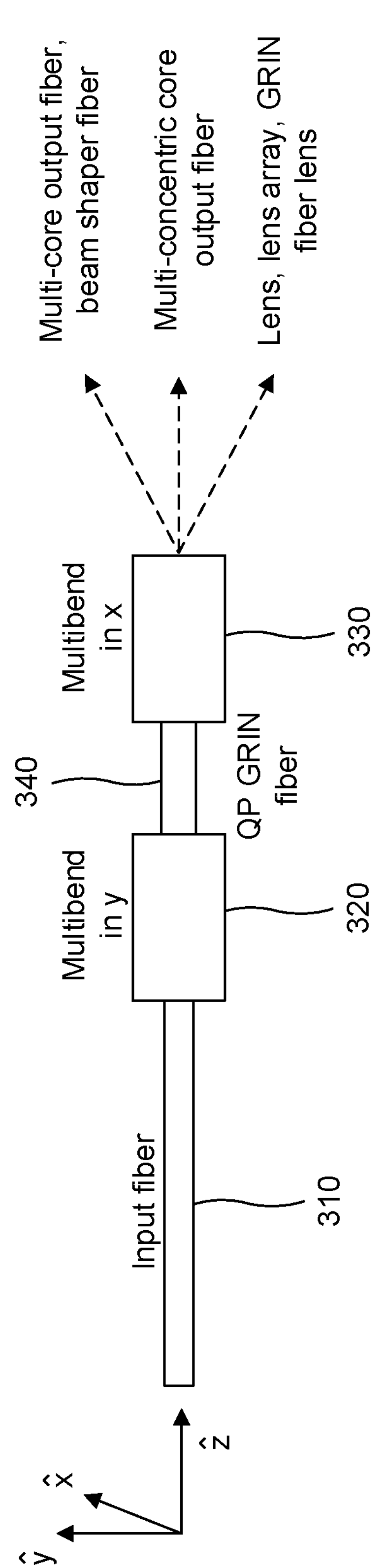
FIG. 3 is a diagram of one or more example implementations of multiple bending devices arranged in a cascaded configuration.
Figure 6A:
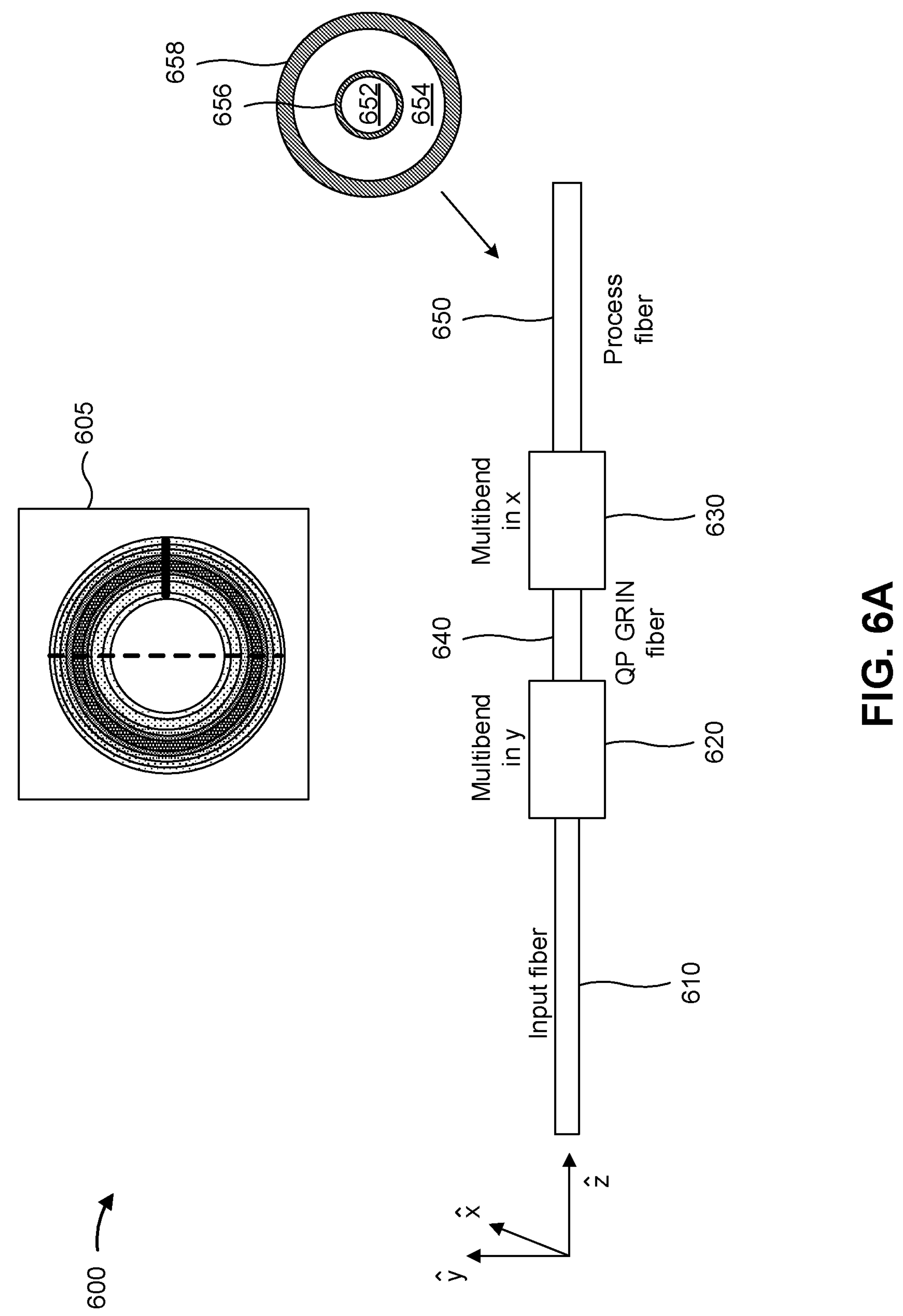
FIG. 6A is a diagram of an example implementation of multiple bending devices arranged in a cascaded configuration to generate a ring intensity pattern of variable ring thickness.

In some implementations, two multi-bend devices 210 can be cascaded, one following the other, with the multi-bend devices 210 oriented in perpendicular orientations with respect to one another (e.g., as shown in FIG. 3 and FIG. 6A and described in further detail below). For example, with an axis of the graded index fiber 210 arranged in a direction z, a first multi-bend device 210 may operate in an x-z plane and a second multi-bend 210 may operate in a y-z plane. Accordingly, the two multi-bend devices 210 may be adjusted independently to allow a user to displace or spatially shift a beam arbitrarily in the x-y plane, which provides a useful capability in many applications where a rasterable or addressable beam position is desired. Additionally, or alternatively, the two-dimensional addressing capability may be realized using a single multi-bend device 210 that can be actuated in any lateral desired direction. For example, the bending device 210 illustrated in FIG. 2 may additionally be rotatable around the fiber axis (e.g., using the rotation mechanism). Additionally, or alternatively, the actuating surfaces that touch the graded index fiber 215 may be small rings or small holes in flat, stacked tabs that can move the graded index fiber 215 in two dimensions at every actuator. The applied motion of the rings or holes may be adjustable in both an x orientation and a y orientation using two-dimensional adjustment stages rather than the one-dimensional stage illustrated in FIG. 2.

In some implementations, the bending device 210 is made to a high precision, as simulations indicate that the desired deflections are on the order of 10 micrometers (μm). Thus, the protrusions 235, 245 may be fabricated to be precisely the same height, or at least have a precise mirroring relationship between the respective sections. For example, in some implementations, the bending device 210 may be fabricated to a high precision using wire electrical discharge machining and/or other suitable techniques.

As indicated above, FIG. 2 is provided as one or more examples. Other examples may differ from what is described with regard to FIG. 2. For example, the number and arrangement of components shown in FIG. 2 are provided as an example. In practice, the arrangement shown in FIG. 2 may include additional components, fewer components, different components, or differently arranged components than those shown in FIG. 2. Additionally, or alternatively, a set of components (e.g., one or more components) in FIG. 2 may perform one or more functions described as being performed by another set of components in FIG. 2.

FIG. 3 is a diagram of one or more example implementations 300 of multiple bending devices arranged in a cascaded configuration. For example, as shown in FIG. 3, an input fiber 310 is coupled to a first bending device 320 and a second bending device 330 arranged in a cascaded configuration with a quarter-pitch graded index fiber 340 between the two bending devices 320, 330. In some implementations, the bending devices 320, 330 may work on the same axes, perpendicular axes, or another mutual angle. For example, in FIG. 3, the bending devices 320, 330 are arranged to work on perpendicular axes. Accordingly, the first bending device 320 may control an angle at which a beam leaves the quarter-pitch graded index fiber 340 in a y direction, and the second bending device 330 may control a spatial offset of the beam in an x direction. Combining the two bending devices 320, 330 with the quarter-pitch graded index fiber 340 between the two bending devices 320, 330 allows for control of both beam offset and beam deflection angle (e.g., near field and far field, respectively) on perpendicular axes, thereby generating skew light rays. If the two bending devices 320, 330 are oriented on the same axis, the two bending devices 320, 330 may generate meridional light rays, again with independent adjustment of both the beam offset and deflection angle. In some implementations, the quarter-pitch graded index fiber 340 between the two bending devices 320, 330 may be the same as in a multi-bend device, or different, and/or the quarter-pitch graded index fiber 340 may include multiple graded index elements that have a net action equivalent to one quarter-pitch graded index element.

In some implementations, the two stages 320, 330 may be combined into one multi-bend device, where the graded index fiber 340 can be bent at every quarter-pitch rather than every odd quarter-pitch. In this case, the odd quarter-pitch bends may adjust the beam offset, and the even quarter-pitch bends may adjust the beam angle, measured from the output end in the event of a total length that is not an integer number of half-pitches. If the odd quarter-pitch bends are oriented perpendicularly to the even ones, then the overall bent fiber shape will be approximately helical and the output light will be skew. On the other hand, the output light will be meridional if the two sets of bends are parallel. With typical quarter-pitch lengths on the order of one (1) mm or less, such a device may require an intricate actuation system, especially if the design objective is to provide full two-dimensional addressability in both the beam offset and beam deflection. Furthermore, in order to provide equal sensitivity for both offset and deflection, the graded index fiber 340 may have a focal length that causes a quarter-pitch beam size to be roughly the same as the size of an input beam provided by the input fiber 310. Accordingly, for beam sizes of interest, the graded index fiber 340 may have a focal length of a few hundred microns. Additionally, or alternatively, the input beam size may be adjusted first (e.g., using a single quarter-pitch graded index fiber of suitable focal strength) to change the beam size to a desired new beam size, and a more preferred focal length of the extended graded index fiber can then be used for the bend array.

In some implementations, as described herein, the bends formed in the graded index fiber 340 may have any periodic bend shape with a bend period equal or approximately equal to a pitch of the graded index fiber 340. In this way, the bends formed in the graded index fiber 340 can be used to manipulate the spatial properties of light carried by the graded index fiber 340. In some implementations, the bending can be two-dimensional (e.g., in the x-z plane, where z is the average propagation direction, such as a simple sinusoid), or the bending can be three-dimensional (e.g., in x, y, and z directions, such as a circular helix, an elliptical helix, and/or a more complicated three-dimensional shape that is periodic in the z direction, among other examples). In some implementations, the bend period can be exactly matched to the pitch of the graded index fiber, or the bend period may be nearly matched to the pitch of the graded index fiber by ±25%, by ±10%, by ±3%, and/or another suitable range. Accordingly, in order to be matched or nearly matched to the pitch of the graded index fiber, a deviation between the bend period and the pitch of the graded index fiber may be required to satisfy (e.g., be less than and/or equal to) a threshold (e.g., ±10% or less). In some implementations, the bending device can, depending on the bend shape, manipulate the beam in the near field (offset position), the far field (beam pointing direction), or both. In this way, forming bends in the graded index fiber 340 that are matched or nearly matched to the pitch of the graded index fiber 340 provide more versatility than adiabatic bending, which is generally limited to manipulating the near field only.

Furthermore, in some implementations, a single bend may be formed in the graded index fiber 340. In general, when a single bend is used, the single bend is substantially equal to or shorter than a half-pitch of the graded index fiber 340, and the single bend is centered on a position in the graded index fiber 215 at least one-quarter-pitch away from an end of the graded index fiber 215. In such cases, some implementations described herein may enhance the bend effect substantially, compared to adiabatic bending. For example, in some implementations, a spliced assembly may include an input fiber to provide a beam, a graded index fiber that is coupled to the input fiber and one-half pitch in length relative to the imaging pitch length of the graded index fiber, and an output fiber capable of receiving a modified beam position from the graded index fiber, with a bend being applied to the graded index fiber, centered on, and strongest at, the middle of the graded index fiber. In some implementations, the bend may or may not extend into the input and/or output fibers, but may generally be weaker in the input and/or output fibers than in the graded index fibers in order to minimize bend stress applied to the splice points. In this case, the spliced assembly may differ from typical adiabatic-bent fibers because the majority of the bend should be equal in length, or shorter, than a half-pitch of the graded index fiber, which would typically be approximately 1-5 mm, and the strongest bend point would be applied not at the output splice point but approximately one quarter-pitch before the output splice, if the objective is to shift the near field only, similar to the adiabatic bend.

In some implementations, an optical system may include an actuation mechanism that allows a bend shape to be adjusted, thereby enabling at least two states of the output beam (e.g., an unperturbed state and a modified state). However, in the simplest case, a static periodic bend shape may be imparted to the graded index fiber 340 such that a given input state is statically transformed into a different output state (e.g., a different beam position and/or beam pointing direction than the input). One example of such a device may include an all-in-fiber rotary beam generator, where the induced fiber bend shape may be helical, and the output beam may be simultaneously offset from the fiber axis and tilted perpendicular to the offset, developing a skew character and orbital angular momentum. If the graded index fiber 340 were to be spliced to an output step-index or ring-index fiber with a radius matched to the spatial offset and an NA matched to the beam tilt angle, then the offset, skew beam would be captured and maintained in a rotating beam. This static rotary beam generator may be realized in an integrated format by fabricating a fiber preform that includes a graded index core that is offset from the fiber center axis, and spinning the fiber during the draw process so that the offset core actually follows a helical path (even though the outside of the fiber may appear straight). If the helical pitch, as determined by the spin rate relative to the draw rate during the fiber drawing process, equals or nearly equals the graded index pitch, then the helical-core fiber can generate a static lateral offset and beam deflection (e.g., a skew beam carrying orbital angular momentum), which may create an annular, rotary beam when the graded index fiber 340 is coupled into an output fiber (e.g., a step-index or ring fiber) of the appropriate diameter and NA to guide the rotary beam. In this way, some implementations described herein may produce a rotary beam that is compact and simple to manufacture. For example, the structure may be only a few millimeters or centimeters long, would not require tapering, would have a straightforward fiber preform fabrication, and may provide an efficient conversion to a rotary beam in terms of both power and brightness.

In some implementations, different options may be used as actuation mechanisms to provide two or more output states in addition to and/or as alternatives to the actuation mechanisms described above. For example, in some implementations, an actuation mechanism may provide full addressability by controlling a two-dimensional transverse position of the graded index fiber at every half-pitch position, every quarter-pitch position, and/or using an array of micro-manipulators, among other examples. In another example, an actuation mechanism may be arranged to switch between a straight fiber shape and a helical fiber shape by holding the graded index fiber straight and slightly tensioned to provide the straight state, and twisting the graded index fiber while providing slight slack in the tension, such that the graded index fiber adopts a helical state with a predetermined pitch. In another example, switching between a straight shape and a helical fiber shape may be enabled by twisting the graded index fiber around a second (non-optical) fiber of suitable diameter and stiffness with a predetermined number of turns, and either tensioning the optical fiber while slackening the non-optical fiber to provide the straight fiber state, or slackening the optical fiber while tensioning the non-optical fiber, to force the optical fiber into a helical conformation.

As indicated above, FIG. 3 is provided as one or more examples. Other examples may differ from what is described with regard to FIG. 3. For example, the number and arrangement of components shown in FIG. 3 are provided as an example. In practice, the arrangement shown in FIG. 3 may include additional components, fewer components, different components, or differently arranged components than those shown in FIG. 3. Additionally, or alternatively, a set of components (e.g., one or more components) in FIG. 3 may perform one or more functions described as being performed by another set of components in FIG. 3.

Figure 4A:
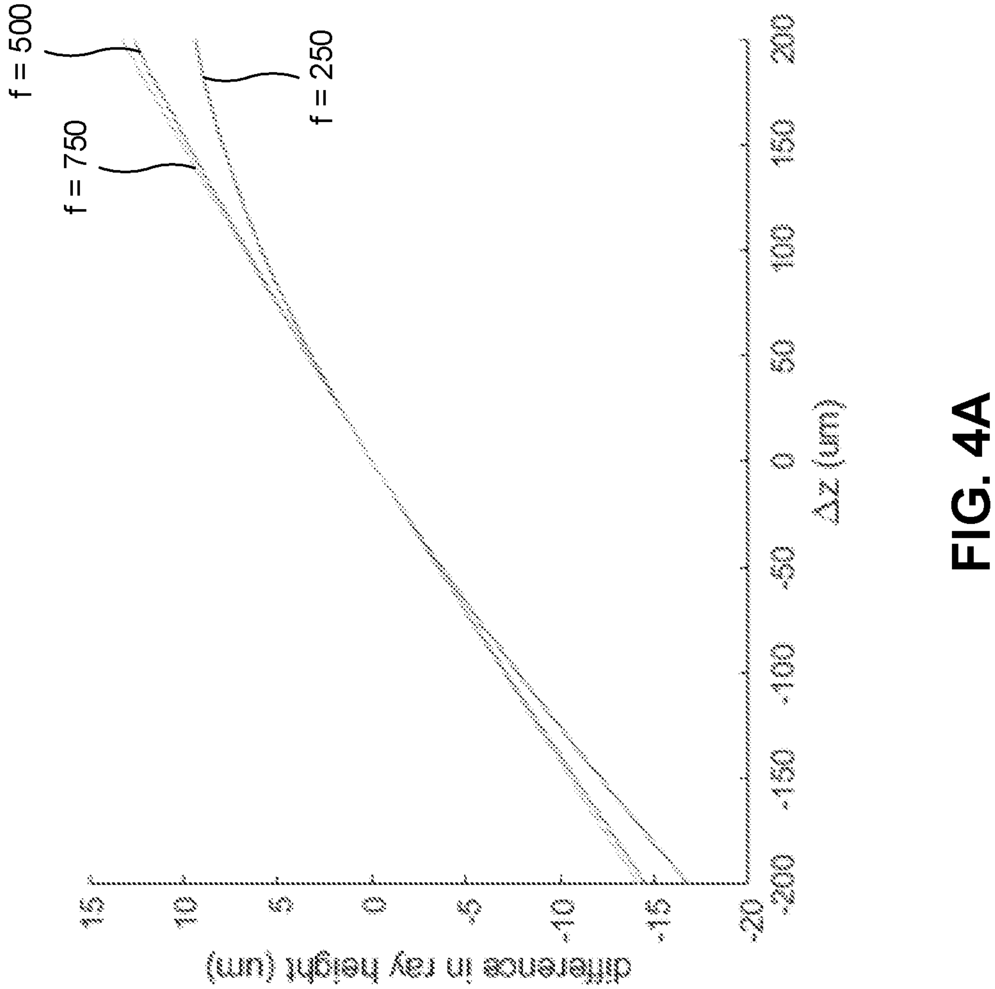
FIGS. 4A-4C are example plots related to a propagation length of a graded index fiber manipulated using bending devices and methods described herein.
Figure 4B:
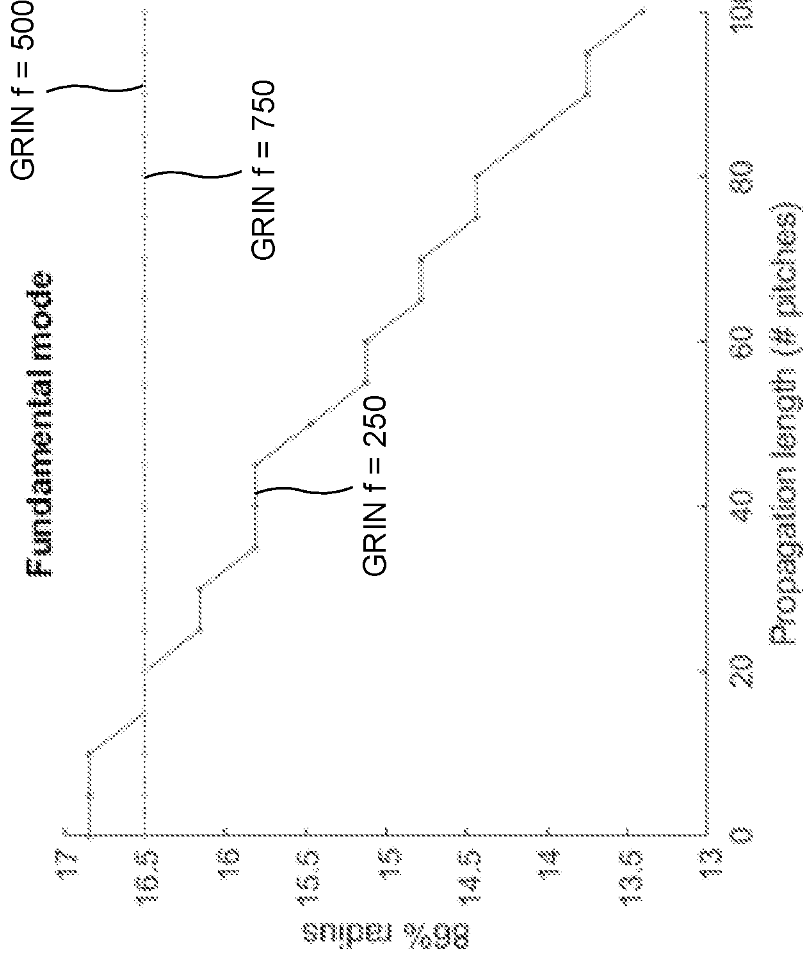
Figure 4C:
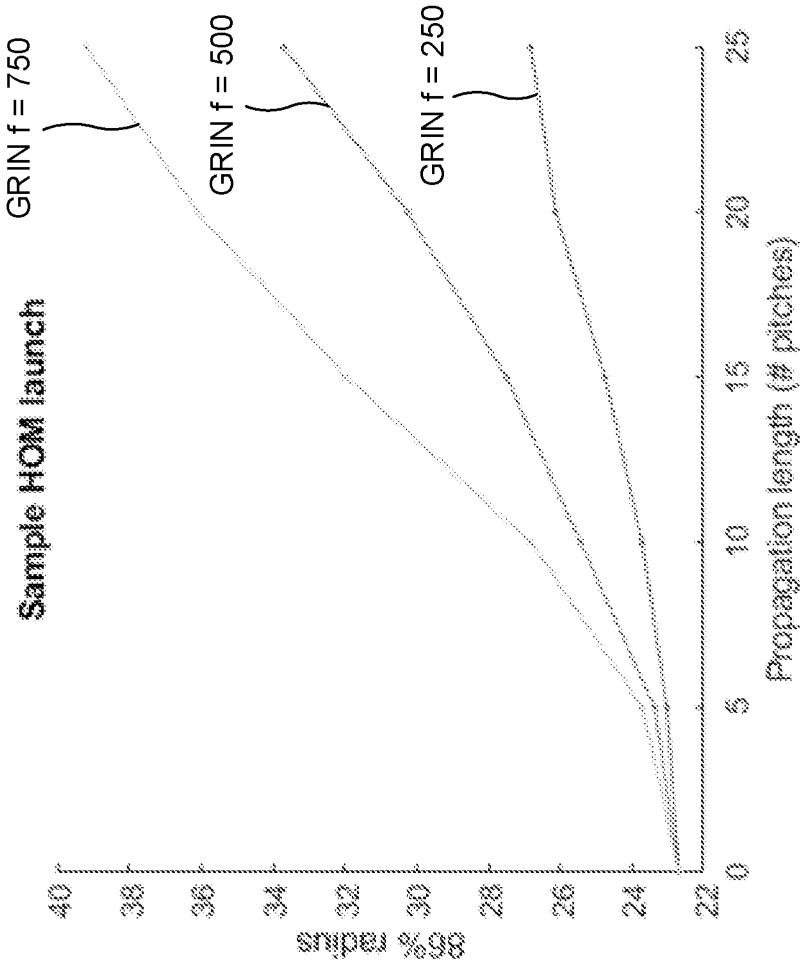

FIGS. 4A-4C illustrate example plots 400, 410, 420 related to a propagation length of a graded index fiber manipulated using one or more bending devices and/or one or more methods described herein. For example, as shown in FIG. 4A, plot 400 illustrates a ray trace within a graded index fiber, showing a single ray propagating near an integer number of pitches. The source NA is 0.1. As shown in FIG. 4B, plot 410 shows a lowest-order linearly polarized fundamental mode (LP01) of a 50 μm and 0.22 NA step index fiber launched into different graded index fibers, which propagates a certain number of pitches. Furthermore, referring to FIG. 4C, plot 420 shows how the "aberrations" of even a perfect graded index fiber affect the beam based on changing a spot size. A higher order mode of the same input fiber propagates through a certain number of pitches in the same graded indexes. Because this mode is less well size-matched to the graded indexes, the higher-order mode experiences more aberrations per pitch and expands faster.

Accordingly, one challenge of the bending devices and methods described herein is to achieve a precise length for the graded index fiber. If the length of the graded index fiber is significantly longer or shorter than an integral number of pitches, the input beam may have a "fuzzed out" image, with power at higher radii, which may incur a penalty in brightness (e.g., an increased beam parameter product (BPP)) when coupled into a delivery fiber. As shown in FIG. 4A, for tight size tolerances of approximately 5 μm, the length tolerance is independent of the graded index fiber focal length, and depends only on the input beam NA. For larger tolerances, the focal length may be a factor, with smaller focal lengths being more forgiving. The most forgiving configuration is to choose a graded index focal length that generates exactly the same spot size in both the near field and the far field (e.g., to size-match the graded index to the input beam). For an input beam radius (w) and a divergence (θ), the appropriate graded index focal length is $f=w/\theta$. In this case, the beam does not change size while propagating (although a shape of the beam may oscillate subtly). In this case, the length of the graded index fiber is not critical, nor is the position of the beginning of the bend array with respect to the beginning of the graded index fiber. However, the period of the bend array is well-matched to the graded index pitch, and the final bend controlled in position relative to the end of the graded index fiber, so that the desired manipulation of the near field and/or the far field is achieved.

Furthermore, an additional design consideration is that graded index "lenses" have aberrations, akin to free space elements. For example, even a graded index fiber with a perfect parabolic refractive index profile does not achieve a precise image every pitch, but rather has small errors that accumulate as more pitches are used. These errors depend strongly on the NA and size of the input beam. For example, if the input is a single fundamental mode in a 50 μm diameter 0.22 NA step index fiber, the input can be almost perfectly reimaged after even 100 pitches in a graded index of the correct focal length, as shown in FIG. 4B. However, choosing a different mode in that input fiber, which has a poorer overlap to a corresponding mode in the graded index fiber, aberration per pitch grows progressively larger, as shown in FIG. 4C, even if the fiber length is chosen perfectly, for the same graded index fibers which maintained the spot size of the LP01 mode group of the input fiber. Generally, for a given input fiber, as the NA increases, the number of graded index pitches before significant aberration occurs will decrease. This is mathematically analogous to using a chain of lenses, each of which has a small amount of spherical aberration. Accordingly, in some implementations, a quantity of pitches in a length of the graded index fiber may be chosen to satisfy a threshold value that is based on one or more metrics related to errors that accumulate per-pitch of the graded index fiber. For example, as shown in FIG. 4C, aberrations significantly increase after a propagation length of approximately ten (10) pitches, whereby the series of bends may be formed in a length of graded index fiber that includes ten or fewer pitches in one example.

In some implementations, the exact length of the graded index fiber may not be an integral number of pitches in applications where maintaining brightness is desired. In some implementations, a device length may be chosen to minimize the spot size, rather than to provide a perfect integral number of pitches (akin to aligning a free space system to the circle of least confusion, as opposed to the paraxial focus). Moreover, dependent on the source, small modifications may be made to the refractive index profile to correct for different aberrations. In this way, the refractive index profile design would not be precisely parabolic, but a slightly different function, while still qualitatively a graded index.

Furthermore, aberration consideration may impact the number of periods of perturbation used. A high NA source may only afford a small number of pitches before the beam "fuzzes out," while a lower NA source may use more pitches. In addition, the required deflection and tolerance on the micrometer stage may be a factor. In an automated system, the micrometers may be replaced with piezoelectrics or similar, enabling sub-second actuation. Additionally, some implementations described herein may have a mechanism to change the effective length to avoid excessive cleaving and polishing to achieve a precise length (e.g., by using heating, longitudinal stress, compressive stress, and/or other suitable techniques to vary the optical path length).

As indicated above, FIGS. 4A-4C are provided as one or more examples. Other examples may differ from what is described with regard to FIGS. 4A-4C.

Figure 5:
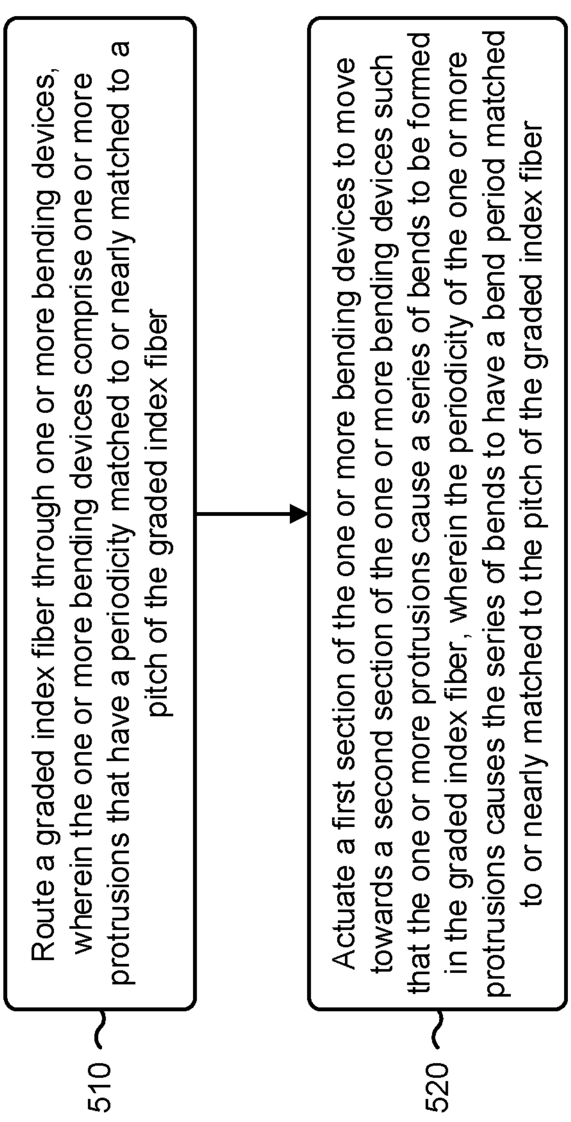
FIG. 5 is a flowchart of an example process for applying a set of bends in a graded index fiber using one or more bending devices.

FIG. 5 is a flowchart of an example process 500 for applying a set of bends in a graded index fiber using one or more bending devices.

As shown in FIG. 5, process 500 may include routing a graded index fiber through one or more bending devices, wherein the one or more bending devices comprise one or more protrusions that have a periodicity matched to or nearly matched to a pitch of the graded index fiber (block 510). For example, in some implementations, a graded index fiber 100, 215, 340 may be routed through one or more bending devices 210, 320, 330, as described above. In some implementations, the one or more bending devices 210, 320, 330 comprise one or more protrusions 235, 245 that have a periodicity matched to or nearly matched to a pitch of the graded index fiber 100, 215, 340.

As further shown in FIG. 5, process 500 may include actuating a first section of the one or more bending devices to move towards a second section of the one or more bending devices such that the one or more protrusions cause a series of bends to be formed in the graded index fiber, wherein the periodicity of the one or more protrusions causes the series of bends to have a bend period matched to or nearly matched to the pitch of the graded index fiber (block 520). For example, in some implementations, a first section 230 of the one or more bending devices 210, 320, 330 may be actuated to move towards a second section 240 of the one or more bending devices 210, 320, 330 such that the one or more protrusions 235, 245 cause a series of bends to be formed in the graded index fiber 100, 215, 340. In some implementations, the periodicity of the one or more protrusions 235, 245 causes the series of bends to have a bend period matched to or nearly matched to the pitch of the graded index fiber 100, 215, 340.

Process 500 may include additional implementations, such as any single implementation or any combination of implementations described below and/or in connection with one or more other processes and/or implementations described elsewhere herein.

For example, in a first implementation, the one or more bending devices may comprise a first bending device 320 arranged to cause a first series of bends in the graded index fiber in a first orientation, and a second bending device 330, following the first bending device 320, to cause a second series of bends in the graded index fiber in a second orientation.

In a second implementation, alone or in combination with the first implementation, the first series of bends in the first orientation and the second series of bends in the second orientation may be perpendicular to one another or parallel to one another.

In a third implementation, alone or in combination with one or more of the first and second implementations, the first series of bends manipulate a beam traveling through the graded index fiber in a near field, and the second series of bends manipulate the beam traveling through the graded index fiber in a far field.

In a fourth implementation, alone or in combination with one or more of the first through third implementations, process 500 includes rotating the one or more bending devices with respect to the graded index fiber, where the periodicity of the one or more protrusions is shorter than the pitch of the graded index fiber, and rotating the one or more bending devices with respect to the graded index fiber elongates the bend period to match or to nearly match the bend period to the pitch of the graded index fiber.

In a fifth implementation, alone or in combination with one or more of the first through fourth implementations, the series of bends are formed in the graded index fiber in two dimensions or in three dimensions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6A is a diagram of an example implementation 600 of multiple bending devices arranged in a cascaded configuration to generate a ring intensity pattern of variable ring thickness. For example, in a similar manner as described above with reference to FIG. 3, example implementation 600 includes an input fiber 610 coupled to a first bending device 620 configured as a first (resonant) beam shifter and a second bending device 630 configured as a second (resonant) beam shifter. As shown in FIG. 6A, the first beam shifter 620 and the second beam shifter 630 may be arranged in a cascaded configuration with a quarter-pitch graded index fiber 640 provided between the two beam shifters 620, 630. In some implementations, the beam shifters 620, 630 may work on the same axes, perpendicular axes, or another mutual angle. In some implementations, combining the two beam shifters 620, 630 with the quarter-pitch graded index fiber 640 between the two beam shifters 620, 630 allows for control of both beam offset and beam deflection angle (e.g., near field and far field, respectively) on perpendicular axes, thereby generating skew light rays. If the two beam shifters 620, 630 are oriented on the same axis, the two beam shifters 620, 630 may generate meridional light rays, again with independent adjustment of both the beam offset and deflection angle. In some implementations, the quarter-pitch graded index fiber 640 between the two beam shifters 620, 630 may be the same as in a multi-bend device, or different, and/or the quarter-pitch graded index fiber 640 may include multiple graded index elements that have a net action equivalent to one quarter-pitch graded index element.

Accordingly, as described herein, a system that includes multiple bending devices arranged in a cascaded configuration as shown in FIG. 6A may be used to perform both near field (space) and far field (divergence angle) in-fiber manipulations of an optical beam. In some implementations, as described herein, the system illustrated in FIG. 6A may be used for variable ring beam generation. Although one or more beams described herein may have ring-shaped intensity distributions in both the near field and the far field, the present disclosure focuses on manipulating a light field pattern in the near field of a process fiber or delivery fiber 650 that includes a center core 652, a ring-shaped outer core 654, an inner cladding 656 that surrounds the center core 652 and separates the center core from the ring-shaped outer core 654, and an outer cladding 658 that surrounds the ring-shaped outer core. For example, using the resonant beam control techniques described in further detail above with reference to FIGS. 1-5, the system shown in FIG. 6A may be used to generate a beam with a ring intensity pattern of a variable ring thickness from a single process fiber 650.

For example, as described above, ring-shaped intensity distributions are desirable for many material processing applications because ring-shaped intensity distributions can have a more uniform melt pool due to a lack of intensity in a beam center. Furthermore, ring-shaped intensity distributions can have significantly higher peak intensity compared to a top-hat beam of the same total power and outer diameter due to a lower effective area. Both behaviors (e.g., reduced intensity in the beam center and higher peak intensity) may depend on an aspect ratio of the ring intensity distribution. For example, as shown by reference number 605 in FIG. 6A, the "aspect ratio" of the ring intensity distribution may refer to a ratio of the outer diameter of the ring (the dashed vertical line) to the thickness of the ring (the thick horizontal line). In general, a ring with a higher aspect ratio will have a higher peak intensity at the same total power and outer diameter (e.g., because the beam has a smaller area). The ability to offer a higher peak intensity at the same total power and outer diameter may be useful for various material processing applications (e.g., a ring-shaped beam may be more desirable for heat conduction mode welding, while a top-hat beam may be more desirable for transition mode welding). Additionally, or alternatively, some applications may benefit from a change in the beam size, beam area, and/or heat-affected zone on the workpiece, which depends on the particulars of the beam shape.

In some implementations, using the resonant beam control techniques described herein, a ring intensity pattern of variable ring thickness may be generated from a single process fiber 650. For example, as shown in FIG. 6A, a system may achieve a ring intensity pattern of variable ring thickness via two cascaded resonant beam shifters 620, 630. The first beam shifter 620 (labeled "multibend in y" in FIG.

6A) may receive a beam from the input fiber 610 and shift the beam spatially such that the ring-shaped outer core 654 of the process fiber 650 is illuminated instead of the center core. The spatial shift produced by the first beam shifter 620 creates, at the end of the process fiber 650, a ring-shaped beam with a diameter that corresponds to the inner diameter of the outer cladding 658, and a ring thickness that corresponds to the thickness of the ring-shaped outer core 654. Using the second resonant beam shifter 630 (labeled "multibend in x" in FIG. 6A), the divergence angle of the beam into the process fiber 650 is modified by adding additional amounts of skew to the rays launched into the process fiber 650. This gives the launched beam an increasing rotary character (e.g., more angular momentum). As the skew is increased, more intensity is pushed to the outside edges of the outer core 654, resulting in a thinner ring. This is an innate characteristic of such rotary beams.

Figure 6B:
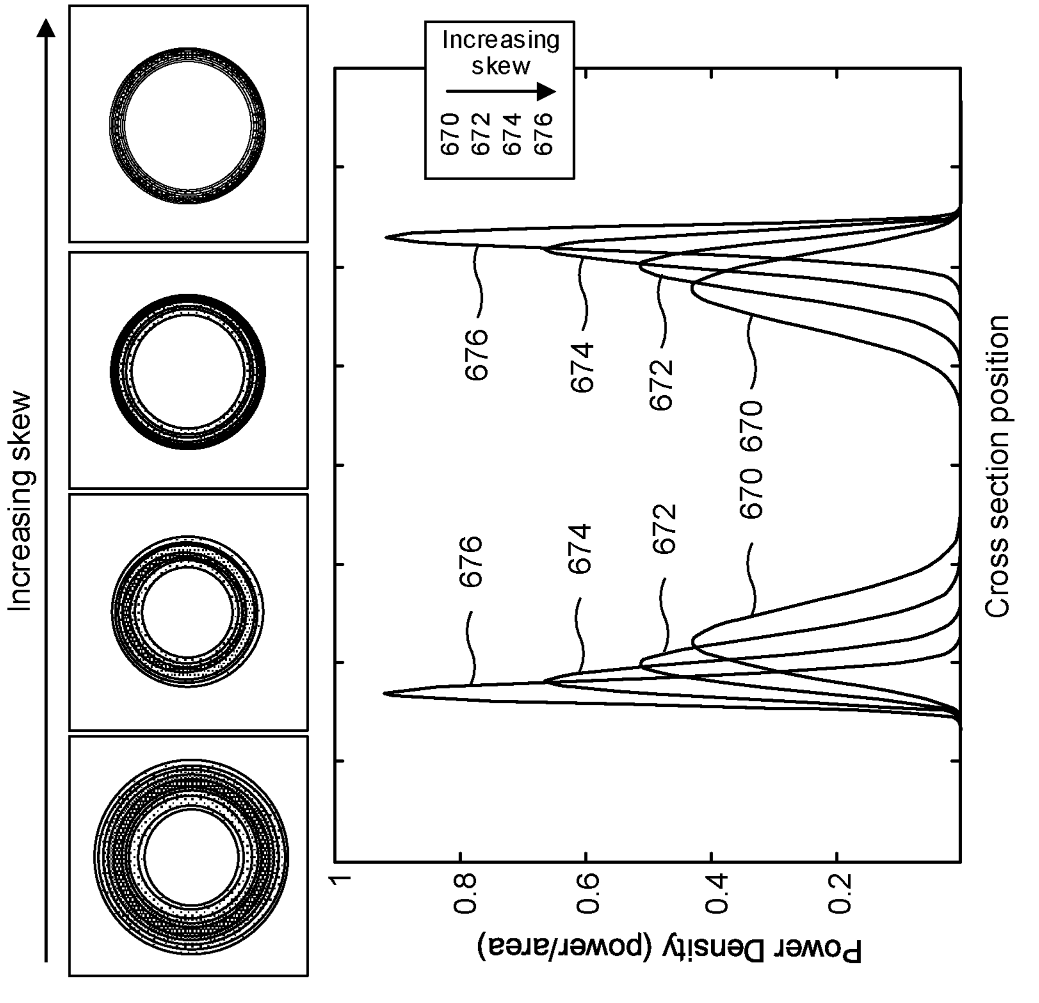
FIG. 6B is a diagram of example power densities corresponding to different cross-section positions associated with different amounts of skew.

FIG. 6B is a diagram 660 illustrating example power densities corresponding to different cross-section positions associated with different amounts of skew. As shown in FIG. 6B, curves 670, 672, 674, 676 represent power densities for different cross-section positions for different amounts of skew. As shown in FIG. 6B, as the magnitude of the skew increases, the individual rays tend to travel close to the outer diameter of the fiber 650 because the in-plane ray angles become closer and closer to parallel to the interface between the outer core 654 and the outer cladding 658. Correspondingly, the BPP of the beam leaving the process fiber 650 will increase due to an increase in divergence from the added skew. Furthermore, a beam with a higher skew may generally have "sharper" edges than a beam with a relatively lower skew. For example, as shown in FIG. 6B, a length scale over which the intensity changes from a maximum value to a minimum value (e.g., to zero (0) or near-zero) is smaller in a high skew beam than a low skew beam, which may be desirable for some processes and/or materials (e.g., the length scale over which the intensity changes from the maximum value to the minimum value is smallest for the curve 676 representing the beam with the highest skew).

Accordingly, in some implementations, a desired range of intensity ring thicknesses or ring diameters may be achieved by different methods, which may include varying the ring dimensions of the process fiber 650 to achieve a thinner or thicker ring or a larger ring diameter. Additionally, or alternatively, the desired range of intensity ring thicknesses or ring diameters may be achieved by using a single-core process fiber 650 and thus starting with a top-hat beam when no skew is added, transitioning to a ring beam with added skew. In this case, low-aspect ratio (low-skew) ring beams may be limited because some skew is typically required to create the near field ring (e.g., a no-skew near field ring profile might not be possible in this case). In another example, the desired range of intensity ring thicknesses or ring diameters may be achieved by using a process fiber 650 with no trench, where the center core 652 is at a higher index than the surrounding secondary core 654. In some implementations, the desired range of intensity ring thicknesses or ring diameters may be achieved with a static offset via an offset splice or similar mechanism (e.g., no beam shifter 620 providing a "multibend in y") and only one resonant beam manipulator to control the skew of the light into the process fiber 650. Additionally, or alternatively, the desired range of intensity ring thicknesses or ring diameters may be achieved in free space using positional control of a lens and a fiber, or motion control of other free space optics such as prisms or a telescope arrangement of axicons (although one advantage provided by some implementations described herein is an all-fiber system with fewer moving parts, none of which require high-precision alignment/realignment). Additionally, or alternatively, the desired range of intensity ring thicknesses or ring diameters may be achieved by creating variable rotary beams via the methods described herein, and using the far fields instead of the near fields. However, in that configuration, both the ring intensity outer diameter and the ring thickness would change, whereas the configuration described herein varies only the ring thickness.

Accordingly, in some implementations, an optical assembly as described herein may comprise an input fiber 610 to provide a beam, a process fiber 650 comprising a ring-shaped outer core 654 surrounded by a cladding 658, a first beam shifter 620 arranged to receive the beam from the input fiber 610 and to shift the beam spatially to illuminate the ring-shaped outer core 654 of the process fiber 650, and a second beam shifter 630 arranged to receive the beam from the first beam shifter 620 and to add skew to the beam that is launched into the ring-shaped outer core 654 of the process fiber 650. In some implementations, the beam leaving the process fiber 650 is a ring-shaped beam with a diameter that corresponds to an inner diameter of the cladding 658 and a maximum thickness that corresponds to a thickness of the ring-shaped outer core 654. Additionally, or alternatively, the beam leaving the process fiber 650 is a ring-shaped beam with a thickness that is based on a magnitude of the skew added to the beam by the second beam shifter 630. In some implementations, the thickness of the ring-shaped beam leaving the process fiber 650 is less than a thickness of the ring-shaped outer core 654. In some implementations, the beam leaving the process fiber 650 has a larger BPP than the beam provided by the input fiber 610. In some implementations, the skew added to the beam by the second beam shifter 630 causes the beam to have a larger power density at outside edges of the ring-shaped outer core 654. In some implementations, a length scale over which an intensity of the beam changes from a maximum to a minimum is based on a magnitude of the skew added to the beam. Furthermore, in some implementations, the process fiber 650 further comprises a center core 652 surrounded by the ring-shaped outer core 654, with the center core 652 having a higher index than the ring-shaped outer core 654 surrounding the center core 652. As further shown in FIG. 6A, the optical assembly may comprise a graded index fiber 640 coupled between the first beam shifter 620 and the second beam shifter 630, where the graded index fiber 640 has a refractive index profile that causes the beam to be re-imaged in the graded index fiber 640 with a regular period having a pitch length, and where the graded index fiber 640 comprises a set of bends that have a bend period matched to or nearly matched to the pitch length of the graded index fiber 640.

Additionally, or alternatively, as described herein, an optical assembly may comprise an input fiber 610 to provide a beam, a process fiber 650 comprising a ring-shaped outer core 654 surrounded by a cladding 658, and a graded index fiber 640, coupled between the input fiber 610 and the process fiber 650, arranged to receive the beam from the input fiber 610 and to transmit the beam into the ring-shaped outer core 654 of the process fiber 650. For example, in some implementations, the graded index fiber 640 may include a beam shifter arranged to add skew to the beam that is transmitted into the ring-shaped outer core 654 of the process fiber 650. In some implementations, the graded index fiber 640 may be spliced to the input fiber 610 at an offset that causes the beam received from the input fiber 610 to be transmitted into the ring-shaped outer core 654 of the process fiber 650. Additionally, or alternatively, the optical assembly may comprise one or more free space optics that have a controlled position and/or a controlled motion to transmit the beam into the ring-shaped outer core 654.

Additionally, or alternatively, as described herein, an optical assembly may comprise an input fiber 610 to provide a beam, a process fiber 650 comprising a single core 652 surrounded by a cladding 656, and one or more resonant beam shifters 620/630, coupled between the input fiber 610 and the process fiber 650, to add skew to the beam such that the beam has a ring-shaped intensity distribution at an exit from the single core 652 of the process fiber 650.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical assembly, comprising:

an input fiber to provide a beam;

a process fiber comprising a ring-shaped outer core surrounded by a cladding;

a first beam shifter arranged to receive the beam from the input fiber and to shift the beam spatially to illuminate the ring-shaped outer core of the process fiber;

a second beam shifter arranged to receive the beam from the first beam shifter and to add skew to the beam that is launched into the ring-shaped outer core of the process fiber; and a graded index fiber coupled between the first beam shifter and the second beam shifter, wherein the graded index fiber comprises multi-bend components that are configured to form bends in the graded index fiber in two dimensions or three dimensions, and wherein the bends have a bend period matched to or nearly matched to a pitch of the graded index fiber.

2. The optical assembly of claim 1, wherein the beam leaving the process fiber is a ring-shaped beam with a diameter that corresponds to an inner diameter of the cladding and a maximum thickness that corresponds to a thickness of the ring-shaped outer core.

3. The optical assembly of claim 1, wherein the beam leaving the process fiber is a ring-shaped beam with a thickness that is based on a magnitude of the skew added to the beam.

4. The optical assembly of claim 3, wherein the thickness of the ring-shaped beam leaving the process fiber is less than a thickness of the ring-shaped outer core.

5. The optical assembly of claim 1, wherein the beam leaving the process fiber has a larger beam parameter product than the beam provided by the input fiber.

6. The optical assembly of claim 1, wherein the skew added to the beam causes the beam to have a larger power density at outside edges of the ring-shaped outer core.

7. The optical assembly of claim 1, wherein a length scale over which an intensity of the beam changes from a maximum to a minimum is based on a magnitude of the skew added to the beam.

8. The optical assembly of claim 1, wherein the process fiber further comprises a center core surrounded by the ring-shaped outer core, the center core having a higher index than the ring-shaped outer core surrounding the center core.

9. An optical assembly, comprising:

an input fiber to provide a beam;

a process fiber comprising a ring-shaped outer core surrounded by a cladding; and a graded index fiber, coupled between the input fiber and the process fiber, arranged to receive the beam from the input fiber and to transmit the beam into the ring-shaped outer core of the process fiber, wherein the graded index fiber includes a beam shifter arranged to add skew to the beam that is transmitted into the ring-shaped outer core of the process fiber, wherein the graded index fiber comprises multi-bend components that are configured to form bends in the graded index fiber in two dimensions or three dimensions, and wherein the bends have a bend period matched to or nearly matched to a pitch of the graded index fiber.

10. The optical assembly of claim 9, wherein the beam leaving the process fiber is a ring-shaped beam with a diameter that corresponds to an inner diameter of the cladding and a maximum thickness that corresponds to a thickness of the ring-shaped outer core.

11. The optical assembly of claim 9, wherein the beam leaving the process fiber is a ring-shaped beam with a thickness that is based on a magnitude of the skew added to the beam.

12. The optical assembly of claim 9, wherein the skew added to the beam causes the beam to have a larger power density at outside edges of the ring-shaped outer core.

13. The optical assembly of claim 9, wherein a length scale over which an intensity of the beam changes from a maximum to a minimum is based on a magnitude of the skew added to the beam.

14. The optical assembly of claim 9, wherein the graded index fiber is spliced to the input fiber at an offset that causes the beam received from the input fiber to be transmitted into the ring-shaped outer core of the process fiber.

15. The optical assembly of claim 9, further comprising:

one or more free space optics having one or more of a controlled position or a controlled motion to transmit the beam into the ring-shaped outer core of the process fiber.

16. An optical assembly, comprising:

an input fiber to provide a beam;

a process fiber comprising a single core surrounded by a cladding;

one or more resonant beam shifters, coupled between the input fiber and the process fiber, to add skew to the beam such that the beam has a ring-shaped intensity distribution at an exit from the single core of the process fiber; and a graded index fiber that comprises multi-bend components that are configured to form bends in the graded index fiber in two dimensions or three dimensions, wherein the bends have a bend period matched to or nearly matched to a pitch of the graded index fiber.

17. The optical assembly of claim 16, wherein the beam at the exit from the single core of the process fiber has a diameter that corresponds to an outer diameter of the cladding and a thickness that is based on a magnitude of the skew added to the beam by the one or more resonant beam shifters.

18. The optical assembly of claim 16, wherein the skew added to the beam increases a divergence angle of the beam into the process fiber.

19. The optical assembly of claim 16, wherein the skew added to the beam causes the beam to have a larger power density at outside edges of the single core.

20. The optical assembly of claim 1, wherein the bend period matching or nearly matching to the pitch of the graded index fiber is based on a deviation between the bend period and the pitch of the graded index fiber satisfying a threshold value.

* * * * *